US009174199B2

(12) United States Patent
Zhang et al.

(10) Patent No.: US 9,174,199 B2
(45) Date of Patent: Nov. 3, 2015

(54) METHANOL STEAM REFORMING CATALYSTS

(75) Inventors: Qinglin Zhang, Manalapan, NJ (US); Robert J. Farrauto, Princeton, NJ (US); Christopher R. Castellano, Ringoes, NJ (US)

(73) Assignee: BASF Corporation, Florham Park, NJ (US)

( * ) Notice: Subject to any disclaimer, the term of this patent is extended or adjusted under 35 U.S.C. 154(b) by 531 days.

(21) Appl. No.: 12/472,104

(22) Filed: May 26, 2009

(65) Prior Publication Data

US 2010/0303713 A1    Dec. 2, 2010

(51) Int. Cl.

| | |
|---|---|
| *C01B 3/08* | (2006.01) |
| *B01J 23/10* | (2006.01) |
| *B01J 23/648* | (2006.01) |
| *B01J 23/62* | (2006.01) |
| *B01J 23/63* | (2006.01) |
| *B01J 37/00* | (2006.01) |
| *B01J 37/02* | (2006.01) |
| *C01B 3/32* | (2006.01) |
| *B01J 23/58* | (2006.01) |
| *B01J 23/89* | (2006.01) |

(52) U.S. Cl.
CPC ............... *B01J 23/6482* (2013.01); *B01J 23/62* (2013.01); *B01J 23/63* (2013.01); *B01J 23/896* (2013.01); *B01J 37/0036* (2013.01); *B01J 37/0236* (2013.01); *C01B 3/326* (2013.01); B01J 23/58 (2013.01); B01J 23/622 (2013.01); B01J 23/648 (2013.01); B01J 23/894 (2013.01); B01J 23/8946 (2013.01); C01B 2203/0233 (2013.01); C01B 2203/066 (2013.01); C01B 2203/107 (2013.01); C01B 2203/1041 (2013.01); C01B 2203/1064 (2013.01); C01B 2203/1094 (2013.01)

(58) Field of Classification Search
CPC .......... Y02E 60/36; C01B 3/10; C01B 3/061; C01B 3/105; C01B 3/063; B01D 53/945; B01D 2255/206; B01J 23/63; B01J 23/10; B01J 37/03
USPC .................................. 502/100–103
See application file for complete search history.

(56) References Cited

U.S. PATENT DOCUMENTS

| | | | |
|---|---|---|---|
| 4,511,673 A | 4/1985 | Eto | |
| 4,613,584 A | 9/1986 | Schneider et al. | |
| 4,822,699 A * | 4/1989 | Wan | 429/40 |
| 5,635,439 A | 6/1997 | Fukui et al. | |
| 5,911,961 A * | 6/1999 | Horiuchi et al. | 423/213.5 |
| 6,413,449 B1 | 7/2002 | Wieland et al. | |

(Continued)

FOREIGN PATENT DOCUMENTS

| | | |
|---|---|---|
| JP | S57197229 | * 12/1982 |
| JP | 07238052 | * 9/1995 |

(Continued)

OTHER PUBLICATIONS

Yuxia Bai et al. Applied Catalysis B : Environmental, vol. 73, pp. 144-149, 2007.

(Continued)

*Primary Examiner* — Bijay Saha
(74) *Attorney, Agent, or Firm* — Lowenstein Sandler LLP

(57) ABSTRACT

Novel catalysts, substantially free of Cu and Zn, useful for the reformation of methanol and steam into $H_2$ for use in hydrogen fuel cells and their use are described herein.

8 Claims, 6 Drawing Sheets

(56) References Cited

U.S. PATENT DOCUMENTS

| | | | |
|---|---|---|---|
| 6,436,363 B1* | 8/2002 | Hwang et al. | 423/651 |
| 6,469,112 B2* | 10/2002 | Cheng et al. | 526/124.3 |
| 6,573,213 B1* | 6/2003 | Ostgard et al. | 502/301 |
| 6,576,217 B1 | 6/2003 | Nojima et al. | |
| 6,632,973 B1* | 10/2003 | Miyake et al. | 588/316 |
| 2001/0016188 A1* | 8/2001 | Haga et al. | 423/648.1 |
| 2001/0021469 A1 | 9/2001 | Kaneko et al. | |
| 2002/0039965 A1 | 4/2002 | Hagihara et al. | |
| 2002/0051747 A1 | 5/2002 | Suzuki et al. | |
| 2002/0150532 A1* | 10/2002 | Grieve et al. | 423/650 |
| 2002/0169075 A1 | 11/2002 | Holzle et al. | |
| 2003/0108465 A1* | 6/2003 | Voss et al. | 423/213.2 |
| 2004/0006915 A1 | 1/2004 | Renn | |
| 2005/0090387 A1* | 4/2005 | Niihara et al. | 502/180 |
| 2005/0121309 A1* | 6/2005 | Chhowalla et al. | 204/173 |
| 2006/0013760 A1 | 1/2006 | Shi et al. | |
| 2007/0099064 A1* | 5/2007 | Masel et al. | 429/40 |
| 2007/0144828 A1* | 6/2007 | Galligan | 181/258 |
| 2007/0183968 A1 | 8/2007 | Healey et al. | |
| 2007/0258882 A1 | 11/2007 | Castellano et al. | |
| 2007/0294942 A1 | 12/2007 | Bert et al. | |
| 2008/0006954 A1* | 1/2008 | Yubuta et al. | 264/5 |
| 2008/0014494 A1* | 1/2008 | Iordache et al. | 429/40 |
| 2008/0032132 A1* | 2/2008 | Woodfield et al. | 428/402 |
| 2008/0058203 A1 | 3/2008 | Iordache-Cazana et al. | |
| 2009/0257928 A1* | 10/2009 | Jia et al. | 422/187 |

FOREIGN PATENT DOCUMENTS

| | | | | |
|---|---|---|---|---|
| JP | 2001129398 | * | 5/2001 | B01J 23/40 |
| JP | 2002263499 | | 9/2002 | |
| JP | 2003154270 | | 5/2003 | |
| JP | 2003160304 | | 6/2003 | |
| JP | 2008043884 | | 2/2008 | |

OTHER PUBLICATIONS

Piboon Pantu et al. Applied Catalysis A : General, vol. 193, pp. 203-214, 2000.

Iwasa, et al., "Applied Catalysis A: General." vol. 125 Issue 1. Apr. 1995. pp. 145-157.

Pfeifer, et al. "Applied Catalysis A: General," vol. 270, Issues 1-2. Aug. 2004. pp. 165-175.

Kim, T., et al., "Journal of Power Sources", vol. 155, Issue 2, Apr. 2006, pp. 231-238.

Iwasa, et al., Catalyst Letter:, vol. 54, Sep. 1998, pp. 119-123.

* cited by examiner

METHANOL STEAM REFORMING CATALYSTS

BACKGROUND

Methanol is an excellent hydrogen and energy source for fuel cells. Methanol's utility derives from its relative ease of storage and transportation as well as the relative ease with which it can be converted to $H_2$ using a reformation reactor. In the reformation reactor, hydrogen is produced from methanol using a metal catalyzed steam reformation process. According to the chemistry of the reaction, and under appropriate conditions, methanol and water are reacted to form hydrogen and carbon dioxide.

$$CH_3OH + H_2O \rightarrow CO_2 + 3H_2 \qquad (1)$$

One drawback of the reformation process is the formation of by-product CO through a pathway distinct from hydrogen production. This by-product of the reformation process must be removed or "scrubbed" from the product $H_2$ prior to introduction into a given fuel cell. Typically, this scrubbing process is achieved through water gas shift reaction. Alternatively, CO may be separated using a Pd or Pd alloy membrane. Pd and Pd alloy membranes, though, require high operating temperatures to be effective; thus, the reformer must be operated at a higher temperature, typically at about 400° C. Such high temperatures, however, require catalysts having excellent durability given that high temperature frequently adversely affects catalyst life.

The utilities of currently available catalyst are affected by these limitations. For example, commercially available copper-zinc catalysts ($CuO$—$ZnO/Al_2O_3$) cannot be used at temperatures above 250° C. due to sintering and deactivation. What is more, these catalysts need to be reduced prior to use in a reformer. A further limitation of copper-zinc catalysts is that they are pyrophoric, creating handling and storage issues.

Various attempts to improve CuO—ZnO catalyst formulations have been described in for example U.S. Pat. No. 6,576,217, as well as U.S. Patent Publication Nos. 2002/0051747, 2002/0169075, and 2004/0006915. The various improvements proposed in the noted documents include introduction of Zr, Al, Ce, or rare earth elements to the copper-zinc formulation.

Substitution of different elements for either Zn or Cu have also been proposed. For example, in U.S. Patent Publication No. 2004/0006915, a catalyst containing ZnO and chromium oxide but not copper oxide was disclosed for use for methanol steam reforming. Other modifications to copper-zinc catalysts include the substitution of Pd for Zn, as discussed in JP Application No. 2002263499; the substitution of Ag for Cu as discussed in JP Application No. 2003154270; the substitution of Cr for Cu as discussed in JP Application No. 2003160304; and the substitution of $SiO_2$ for Zn as discussed in JP Application No. 2008043884. These formulations, however, have not resolved the inherent limitations present in Zn, Cu, or CuZn derived catalysts.

Recently, a non-CuZn base-metal catalyst, alumina supported FeCoNi, was described in U.S. Patent Publication No. 2007/0294942. This catalyst, however, requires expensive organometallic complexes and template molecules to achieve the desired crystal size, thus limiting its utility. Moreover, like copper-zinc catalysts, this base-metal based catalyst is prone to deactivation at high temperatures.

Various other Zn based methanol reformation catalysts are known. For example, U.S. Pat. No. 4,613,584 describes the utility and the formation of PdZn and PtZn alloys for methanol steam reforming. See also Iwasa et al., *Applied Catalysis A: General*, 1995, 125(1): 145-157 as well as U.S. Pat. No. 6,413,449.

PdZnZr based catalysts are described in U.S. Patent Publication No. 2001/0021469, while Pd/Pt—CuZn catalysts are described in U.S. Patent Publication No. 2002/0039965. These catalyst, though, also suffer from deactivation. For example, deactivations of alumina supported PdZn catalysts have been reported at 285° C. (see Pfeifer et al, *Applied Catalysis A: General*, 270 (1-2), 165-175, 2004) and even at 250° C. (see Kim, T., et al, *Journal of Power Sources*, 2006, 155, (2), 231-238). PdZnZr catalyst is further plagued by the potential leaching of Zn during the reforming process. The leached Zn may damage any separation membrane present, as well as the fuel cell itself.

Other known alloys suitable for methanol steam reformation include ZrCu, ZrAu, HfCu, ZrCo, and YNi. Despite their utility, these catalysts are difficult to prepare and require melting metal salt precursors. See e.g., U.S. Pat. No. 5,635,439.

Pd—Ga, Pd—In, Pt—Ga and Pt—In catalysts (Iwasa, *Catalyst Letter* 54, 1998, 119-123) as well as Pt—Ce/Fe/La— supported on alumina (U.S. Patent Publication No. 2007/0183968) have likewise been shown to be active for methanol steam reforming. These catalysts, too, require melting metal precursors or multi-step processes involving pre-reduction of Pt followed by sequential loading of other metals.

Thus, although the art describes many catalysts useful for methanol steam reformation, each of the variously known catalysts has at least one characteristic that renders the catalyst less than suitable for large-scale commercial use.

In view of the forgoing, it is an objective of the present disclosure to provide new catalyst formulations and processes for making these catalysts, that alleviate many or all of the failures of currently available methanol steam reforming catalysts. In particular, it is an objective of the present disclosure to provide air-stable catalysts for the reformation of methanol that operate continuously at at least about 350° C. and that are easily prepared without the need for melting or pre-reduction.

SUMMARY

In an embodiment, the catalyst can comprise Pt or Pd; an element for alloy formation selected from the group consisting of Sc, Hf, V, Nb, Ta, Ru, Os, Co, Rh, Ir, Ni, B, Al, Ga, In, Ti, C, Si, Ge, Sn, and Pb; and at least one promoter element selected from group consisting of Li, Na, K, Rb, Cs, Be, Mg, Ca, Sr, Ba, Fe, La, Y, Zr, and combinations thereof. The catalyst is substantially free of both Cu and Zn. The catalyst further includes a suitable carrier or support selected from the group consisting of alumina, silica, $CeO_2$, carbon, and mixtures thereof.

In an embodiment, the catalyst may be operated at temperatures of at least about 200° C. In another embodiment, the catalyst may be operated at about 350 to about 425° C. The catalyst described herein does not exhibit any the above-described shortcomings of either copper-zinc or palladium-zinc catalysts. Further, the preparation of the catalyst described herein does not involve melting metal or metal precursors, nor multiple steps involving pre-reduction of one element followed by sequential loading. The disclosed catalyst can be applied to traditional oxide supports, ceramics, or metal substrates including foils, heat-exchange plates, etc. to make highly efficient and compact methanol reformers for hydrogen fuel cell applications.

The catalyst may be prepared quickly and easily and may be applied to various structured metallic and non-metallic surfaces. Alternatively, the catalyst may be used as a powder, in granular form, as pellets, or in any other physical form suitable for the targeted applications.

The present disclosure describes a catalyst that is substantially free of Cu and Zn. This catalyst can comprise a first metal selected from Pt or Pd; an element for alloy formation selected from the group consisting of Sc, Hf, V, Nb, Ta, Ru, Os, Co, Rh, Ir, Ni, B, Al, Ga, In, Ti, C, Si, Ge, Sn, and Pb; and at least one promoter element selected from group consisting of Li, Na, K, Rb, Cs, Be, Mg, Ca, Sr, Ba, Fe, La, Y, Zr, and combinations thereof.

In one embodiment, the first metal is Pt. In a sub-embodiment, the element for alloy formation is V. In a further sub-embodiment, the at least one promoter is Zr. In another sub-embodiment, the element for alloy formation is Ti. In a further sub-embodiment, the at least one promoter element is Zr.

In another embodiment, the first metal is Pd. In one sub-embodiment, the element for alloy formation is Ga. In a further sub-embodiment, the at least one promoter element is Zr. In a further sub-embodiment, the catalyst comprises a second promoter element. In certain embodiments the second promoter element is Y. In other embodiments the second promoter element is Ba.

In a further sub-embodiment, the catalyst comprises a third promoter element. In certain embodiments the third promoter element is Ba. In other embodiments, the third promoter element is Fe.

The catalyst of the invention may further include a support. In certain embodiments, the support is $CeO_2$.

The present disclosure also includes method of preparing the catalysts described herein. In certain embodiments, the method comprises forming a first aqueous solution of a complex or salt of a first metal, a complex or salt of an element for alloy formation, and a complex or salt of at least one promoter. The method may further comprise forming a second aqueous solution comprising sodium carbonate and, optionally, urea. The method may further comprise adding a support to the second aqueous solution to form a slurry. The method may further comprise mixing the first aqueous solution with the slurry in order to form a second slurry.

The method may further comprise milling the second slurry, drying the slurry to form a pre-catalyst, and calcining the pre-catalyst to form a catalyst described herein.

The present disclosure further includes a method of reforming methanol and steam to hydrogen gas. In one embodiment, the method comprises heating a methanol water solution to form a methanol water vapor. The method may further comprise feeding said vapor to a methanol reformation apparatus containing a methanol water reformation catalyst heated to at least about 200° C. The method may further comprise contacting the methanol water vapor with the heated catalyst.

In certain embodiments of the method of reforming methanol and steam to hydrogen, the catalyst is substantially free of Cu and Zn, and comprises a first metal selected from Pt or Pd; an element for alloy formation selected from the group consisting of Sc, Hf, V, Nb, Ta, Ru, Os, Co, Rh, Ir, Ni, B, Al, Ga, In, Ti, C, Si, Ge, Sn, and Pb; and at least one promoter element selected from group consisting of Li, Na, K, Rb, Cs, Be, Mg, Ca, Sr, Ba, Fe, La, Y, Zr, and combinations thereof.

DRAWINGS

For the purpose of illustrating the utility of catalysts described herein, there are depicted in the drawings certain embodiments in various tables and graphs. However, the invention is not limited to the precise arrangements and instrumentalities of the embodiments depicted in the drawings.

DETAILED DESCRIPTION

Definitions & Abbreviations

Figure 1:
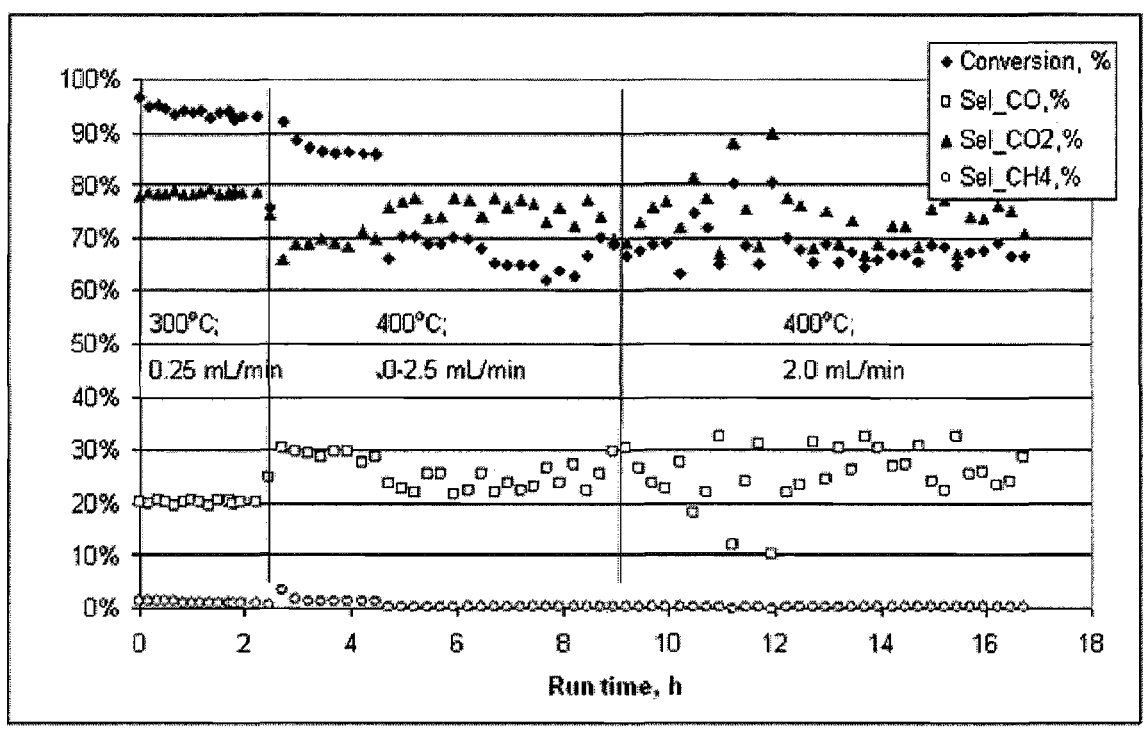
FIG. 1 illustrates time on-stream performance with PtV—Zr/$CeO_2$.
Figure 2:
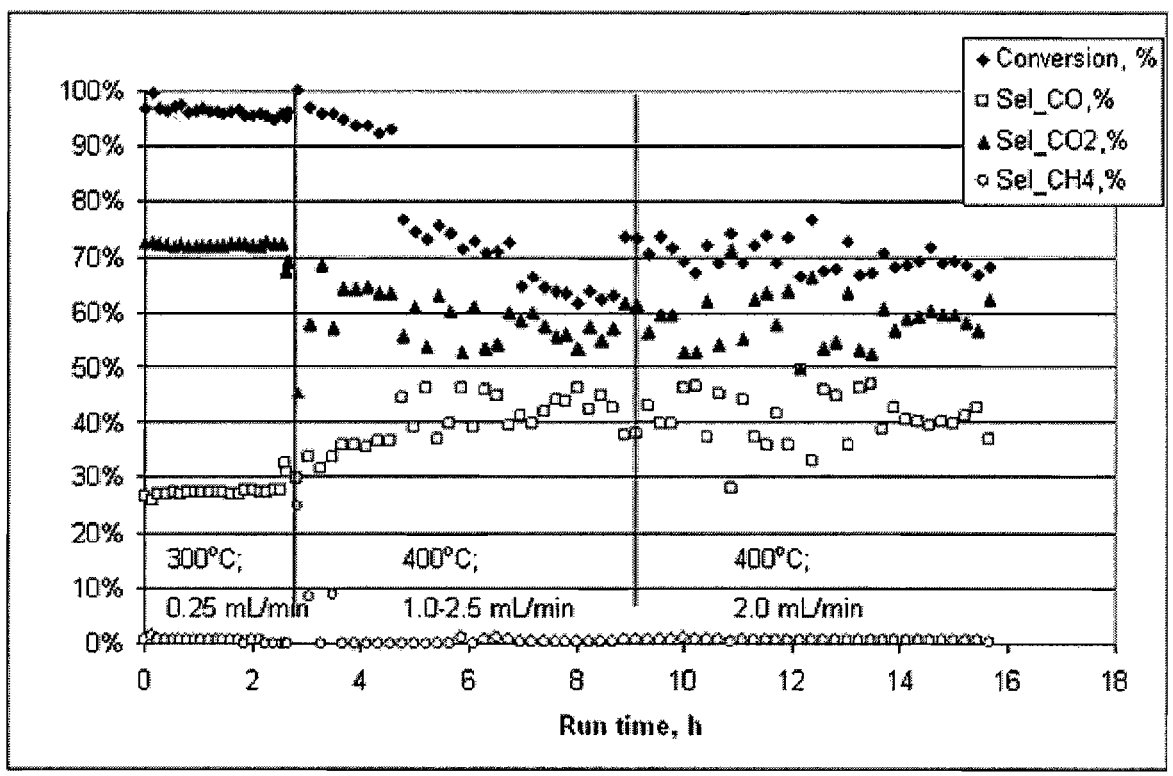
FIG. 2 illustrates time on-stream performance with PtTi—Zr/$CeO_2$.
Figure 3:
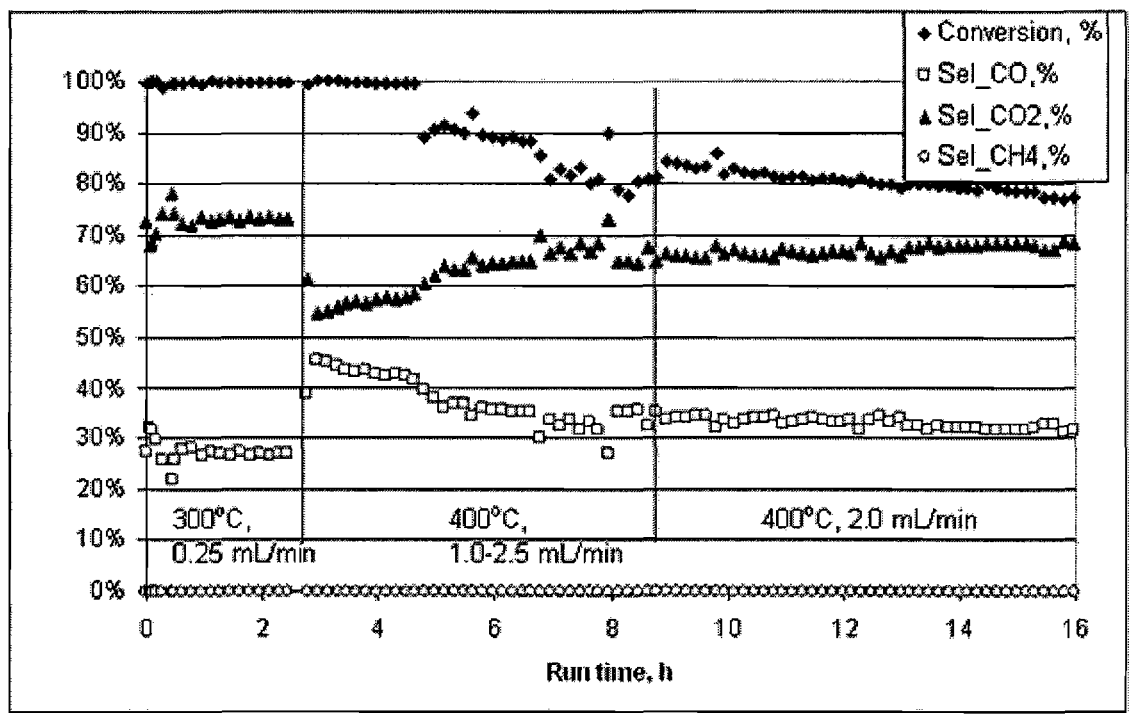
FIG. 3 illustrates time on-stream performance with PdGa—ZrY/$CeO_2$.
Figure 4:
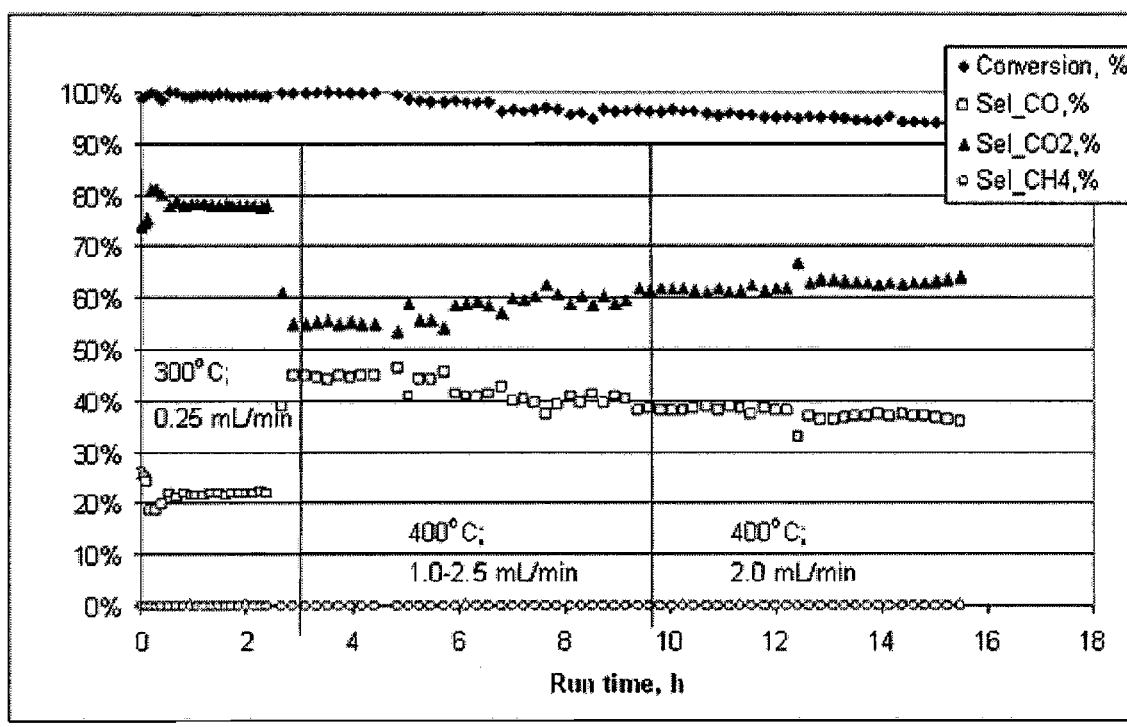
FIG. 4 illustrates time on-stream performance with PdGa—BaZrY/$CeO_2$.
Figure 5:
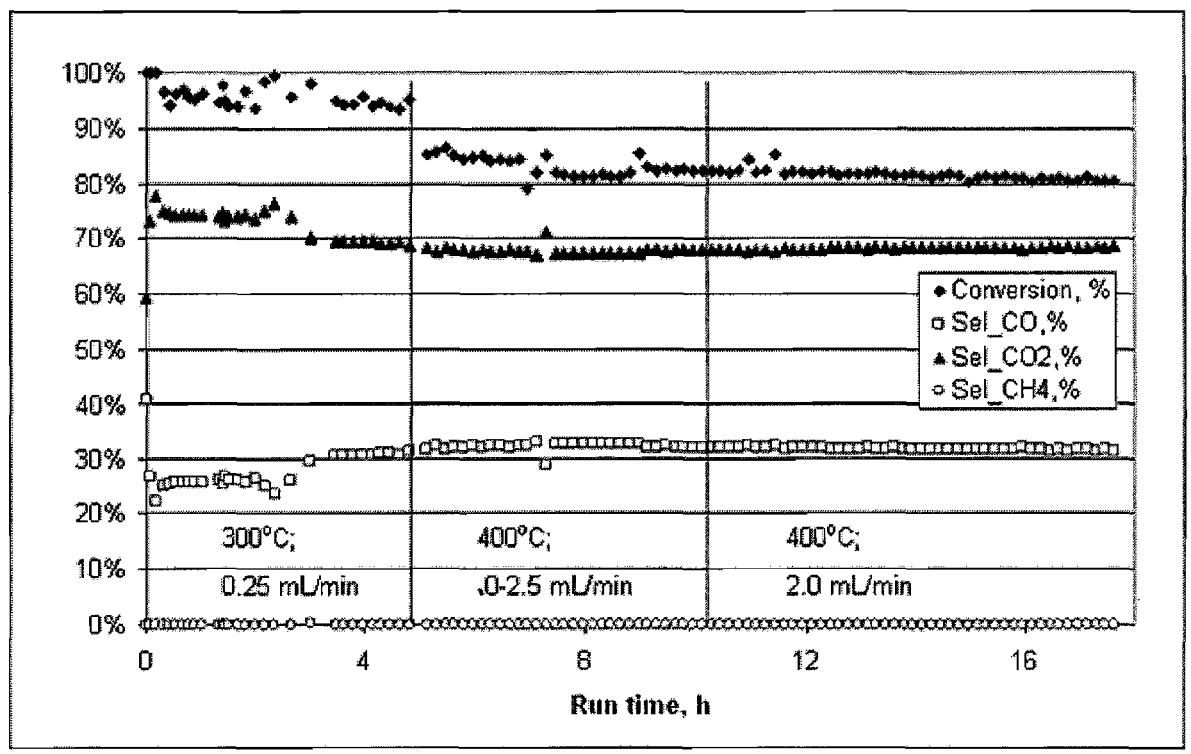
FIG. 5 illustrates time on-stream performance with PdGa—FeBaZr/$CeO_2$.

In accordance with this detailed description, the following abbreviations and definitions apply. It must be noted that as used herein, the singular forms "a", "an", and "the" include plural referents unless the context clearly dictates otherwise. Thus, for example, reference to "a catalyst" includes a plurality of such catalysts and reference to "the catalyst" includes reference to one or more catalysts and equivalents thereof known to those skilled in the art, and so forth.

Unless defined otherwise, all technical and scientific terms used herein have the same meaning as commonly understood by one of ordinary skill in the art. The following terms are provided below.

The term "alloy" as used herein refers to a bonding structure of two or more elements in their reduced or partially reduced forms without limitation to any specific coordination among the elements present.

Reference to elements of the periodic table are to their one or two letter referents as would be known.

The catalyst comprises Pt or Pd generally at about 0.2 to about 20 weight percent of the catalyst. In certain embodiments, the Pt or Pd comprises about 0.5 to about 10 weight percent of the catalyst.

The catalyst further comprises an element for alloy formation with Pt or Pd. The element for alloy formation is selected from Sc, Hf, V, Nb, Ta, Ru, Os, Co, Rh, Ir, Ni, B, Al, Ga, In, Ti, C, Si, Ge, Sn, or Pb. Examples of elements exemplary for alloy formation include V, Ni, Ti, Ga, In, and Co. The molar ratio of the alloy element to the Pt or Pd is from at least about 1 to about 5. In certain embodiments, the ratio is from at least about 1 to about 3. The catalyst described herein is substantially free of both Cu and Zn.

The catalyst further includes at least one promoter element. The promoter element is selected from the group consisting of Li, Na, K, Rb, Cs, Be, Mg, Ca, Sr, Ba, Fe, La, Y, Zr and combinations thereof. The promoter element can be present in a range of 0 to about 10 weight percent of the total catalyst. In certain embodiments, the promoter can be present in from about 0.1 to about 3 weight percent. Examples of elements exemplary for use as promoters include Mg, Ba, Fe, La, Y, Zr, and mixtures thereof.

The catalyst can further comprise a suitable carrier or support. Examples of suitable carriers and supports include alumina, silica, $CeO_2$, ceramics, and carbon. Mixtures of these supports may also be used. In certain embodiments, the supports have a surface area of at least about 5 $m^2$/g. An exemplary support is $CeO_2$.

The support may be prepared with or without an alkaline pre-treatment. When employed, the alkaline pretreatment involves treating the support, for example $CeO_2$, with an aqueous solution of at least urea and sodium carbonate. Without wishing to be bound to any particular theory, it is believed that the alkaline pretreatment reduces the acidity of the $CeO_2$ support, and in turn, results in a catalyst having observably higher methanol reformation activity.

Once prepared on solid support following a drying and calcining procedure to prepare the oxidized catalyst, the catalyst may be heated to a temperature of at least about 200° C. to produce hydrogen on contact with methanol and water. In certain embodiments, the catalyst is heated to about 350 to about 425° C. In certain embodiments, the catalyst is heated to about 400° C. In order to produce hydrogen efficiently, a vaporized methanol water solution is passed over the hot catalyst.

Without wishing to be bound to a particular theory, it is believed that in the presence of methanol and water vapor, the Pd or Pt oxides formed during calcination process are reduced to their zero oxidation states, at which point the Pd or Pt metal forms an alloy in situ with the element for alloy formation. As previously identified, these elements include Sc, Hf, V, Nb, Ta, Ru, Os, Co, Rh, Ir, Ni, B, Al, Ga, In, Ti, C, Si, Ge, Sn, and Pb. These elements, which may also have formed oxides during the calcination process, may likewise be reduced during the catalytic process. Promoter elements selected from group consisting of Li, Na, K, Rb, Cs, Be, Mg, Ca, Sr, Ba, Fe, La, Y, and Zr, may also be partially reduced under the conditions described herein.

The catalysts described herein may be prepared in a short preparative sequence. According to the general preparative methodology, a first aqueous solution of a water soluble Pt or Pd salt or complex is formed. A water soluble salt or complex of the element useful for alloy formation is generally added next, followed by the addition of one or more water soluble salts or complexes of the promoter element or elements required for a specific formulation.

Next, a second aqueous solution can be prepared. This solution optionally contains urea and, optionally, a water soluble salt or complex of a promoter element. In one embodiment, for example, sodium may be the promoter element, and it may be added in the form of $Na_2CO_3$. The salt or complex of the promoter element added to the second solution may be the same as or different from the salt or complex of the promoter element(s) added to the first solution. Subsequently, a known quantity of solid support is added to the second aqueous solution, forming a dense slurry.

The first aqueous solution is then added to the dense slurry. The resulting combination is well stirred and then wet milled, typically in a ball mill, to provide solid particles of a desired size. In certain embodiments, the particles can be at least about 3 to about 20 µm in diameter. In other embodiments, the particles can be at least about 5 to about 10 µm in diameter after milling. The catalyst may then be coated onto a monolithic ceramic or metal structure or metal foil or heat exchange for drying. Alternatively, the catalyst may be dried directly.

In either situation, the milled slurry is dried at a temperature of at least about 100° C. In certain embodiments, the slurry is dried at at least about 120° C., for at least about one hour. In certain embodiments, the milled slurry may be dried for at least two hours. Drying times and temperatures may vary depending upon the catalyst being prepared. It is within the skill level of one of ordinary skill in the art to determine whether a catalyst is sufficiently dry prior to calcining the catalyst. After drying, the catalyst is calcined in air at about 100 to about 700° C. In one embodiment, the catalyst can be calcined at about 500° C. In another embodiment, the catalyst can be calcined at about 550° C. In one embodiment, the calcining process generally requires at least about 3 hours. In some embodiments, calcination may require more time, such as for example at least about 4 hours.

EXAMPLES

The catalyst disclosed herein is now further detailed with reference to the following examples. These examples are provided for the purpose of illustration only and the catalyst disclosed herein should in no way be construed as being limited to these examples but rather should be construed to encompass any and all variations which become evident as a result of the teaching provided herein. Comparative catalyst examples are likewise provided. Unlike the catalyst disclosed herein, the comparative examples include zinc in their formulation.

In each of the examples described below, "water" refers to deionized water. Unless otherwise specified, all reactions take place at atmospheric pressure.

Example 1

$PtV—Zr/CeO_2$

A first solution containing Pt and V was prepared by adding 15.244 g of hexahydroxy(IV)platinic acid ($H_2Pt(OH)_6$) solution (16.40 wt % Pt), 1.795 g $NaVO_3$ and 1.484 g $Zr(OH)_4$ in 35 g of water with stirring.

A second solution was prepared by adding 7.5 g urea and 0.461 g $Na_2CO_3$ in 30.0 g water. The second solution was then mixed with 50.0 g of $CeO_2$ (HSA20 from Rhodia) in a ball mill jar, resulting in a dense slurry. The first solution was then brought into contact with the dense slurry. The resulting mixture was ball-milled until about 90% of the solid particles were less than about 10 µm in diameter. Subsequently, the slurry was dried at about 120° C. for about 2 h and calcined in air at about 550° C. for 4 h.

As can be seen in FIG. 1, over 95% methanol conversion was achieved using this catalyst at 300° C. with a methanol/water feed rate of 0.25-1.0 mL/min. Increasing the feed rate to 2.5 mL/min at about 400° C. resulted in a decrease in methanol conversion and a slight increase in CO selectivity.

Example 2

$PtTi—Zr/CeO_2$

A first solution containing Pt and Ti was prepared by adding 15.244 g of hexahydroxy (IV) platinic acid ($H_2Pt(OH)_6$) solution (16.40 wt % Pt), 7.611 g titanium diisopropoxide bis(acetylacetonate) ($C_6H_{28}O_6Ti$, 75% solution in isopropanol) and 1.484 g $Zr(OH)_4$ in 35 g of water with stirring.

A second solution was prepared by adding 7.5 g urea and 0.461 g $Na_2CO_3$ in 30.0 g water. The second solution was then mixed with 50.0 g of $CeO_2$ (HSA20 from Rhodia) in a ball mill jar, resulting in a dense slurry. The first solution was then brought into contact with the dense slurry. The resulting mixture was ball-milled until about 90% of the solid particles were less than 10 µm in diameter. Subsequently, the slurry was dried at about 120° C. for about 2 h and calcined in air at about 550° C. for about 4 h.

The performance of the above described catalyst appears slightly inferior to that of Example 1. The catalyst of Example 2 has a lower methanol conversion and a higher CO selectivity. The catalyst, however, effectively generates $H_2$.

Examples 3

PdGa—ZrY/CeO$_2$

A first solution containing Pd and Ga was prepared by adding 11.844 g of Pd(NO$_3$)$_2$ solution (20.77 wt % Pd), 27.506 g gallium nitrate hydrate, 1.484 g Zr(OH)$_4$, and 8.952 g Y(NO$_3$)$_3$.6H$_2$O in 42.0 g of water with stirring.

A second solution was prepared by adding 7.5 g urea and 0.461 g Na$_2$CO$_3$ in 30.0 g water. The second solution was then mixed with 50.0 g of CeO$_2$ (HSA20 from Rhodia) in a ball mill jar, resulting in a dense slurry. The first solution was then brought into contact with the dense slurry. The resulting mixture was ball milled until about 90% of the solid particles were less than about 10 μm in diameter. Subsequently, the slurry was dried at about 120° C. for about 2 h and calcined in air at about 550° C. for about 4 h.

Complete conversion of methanol was observed with catalyst of this example at about 300° C. using a methanol/water feed rate of about 0.25 mL/min. Methanol conversion decreased to 80% when the methanol/water feed rate was increased to about 2.0 mL/min, and the temperature was raised to about 400° C.

Example 4

PdGa—BaZrY/CeO$_2$

A first solution containing Pd and Ga was prepared by adding 11.844 g of Pd(NO$_3$)$_2$ solution (20.77 wt % Pd), 27.506 g gallium nitrate hydrate, 1.484 g Zr(OH)$_4$, 0.477 g Ba(NO$_3$) and 8.952 g Y(NO$_3$)$_3$.6H$_2$O in 42.0 g of water with stirring.

A second solution was prepared by adding 7.5 g urea and 0.461 g Na$_2$CO$_3$ in 30.0 g water. The second solution was then mixed with 50.0 g of CeO$_2$ (HSA20 from Rhodia) in a ball mill jar, resulting in a dense slurry. The first solution was then brought into contact with the dense slurry. The resulting mixture was ball milled until about 90% of the solid particles were less than about 10 μm in diameter. Subsequently, the slurry was dried at about 120° C. for about 2 h and calcined in air at about 550° C. for about 4 h.

Addition of Ba as a promoter to the catalyst of Example 3 improved both the catalyst activity and stability. Over about 95% methanol conversion was achieved with a methanol/water feed rate of about 2-2.5 mL/min at about 400° C.

Example 5

PdGa—FeBaZr/CeO$_2$

A first solution containing Pd and Ga was prepared by adding 11.844 g of Pd(NO$_3$)$_2$ solution (20.77 wt % Pd), 27.506 g gallium nitrate hydrate, 0.477 g Ba(NO$_3$) and 1.809 g Fe(NO$_3$)$_3$.9H$_2$O in 42.0 g of water with stirring.

A second solution was prepared by adding 7.5 g urea and 0.461 g Na$_2$CO$_3$ in 30.0 g water. The second solution was then mixed with 50.0 g of CeO$_2$ (HSA20 from Rhodia) in a ball mill jar, resulting in a dense slurry. The first solution was then brought into contact with the dense slurry. The resulting mixture was ball milled until about 90% of the solid particles were less than about 10 μm in diameter. Subsequently, the slurry was dried at about 120° C. for about 2 h and calcined in air at about 550° C. for 4 h.

Introduction of Fe as the promoter to the formulation described in Example 4 resulted in slight decrease in the activity, but improved CO$_2$ selectivity from about 65% to about 70%.

Comparative Example 1

PdZn—ZrY/CeO$_2$

Figure 6:
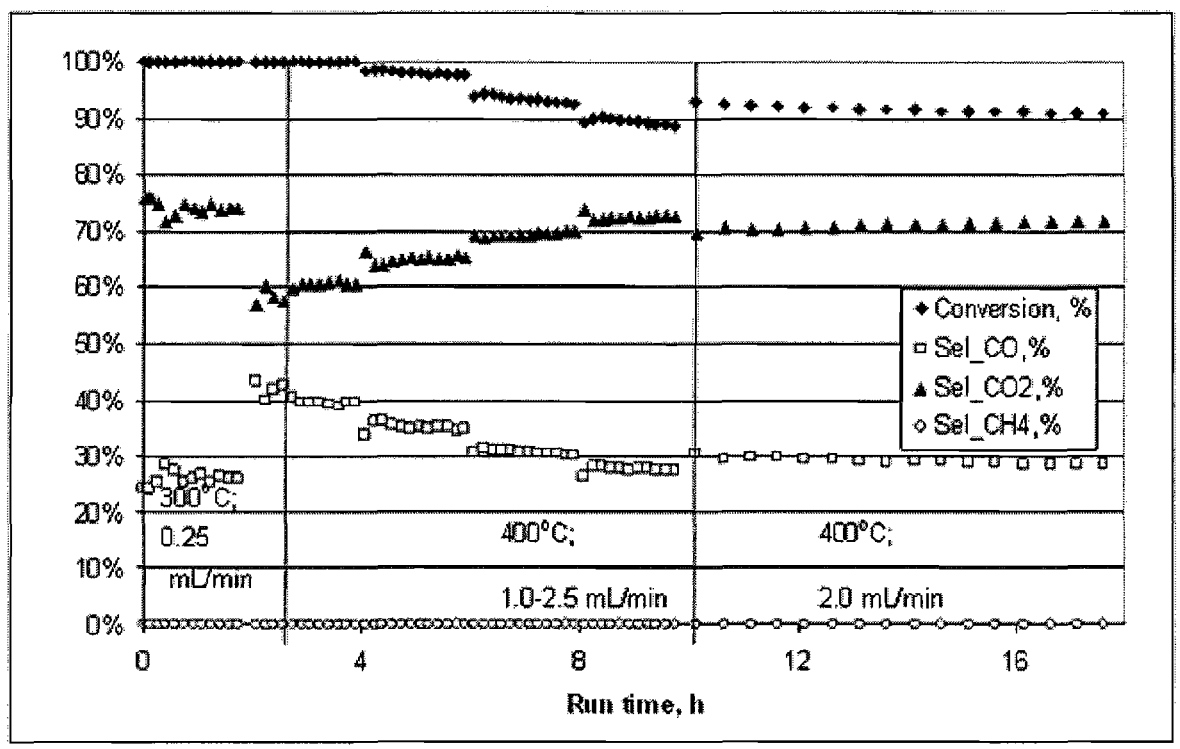
FIG. 6 illustrates time on-stream performance with PdZn—ZrY/$CeO_2$.

A solution containing Pd, Zn, Y, and Zr was prepared by adding 4.734 g of Pd(NO$_3$)$_2$ solution (20.77 wt % Pd), 15.508 g Zn(NO$_3$)$_2$.6H$_2$O, 0.581 g Zr(OH)$_4$ and 4.269 g Y(NO$_3$)$_3$.6H$_2$O in 7.0 g of water with stirring. The solution was then brought in contact with 20 g.0 of CeO$_2$ support (HSA5 from Rhodia). The resulting slurry was ball milled until about 90% of the solid particles were less than about 10 μm in diameter. Subsequently, the slurry was dried at about 120° C. for about 2 h and calcined in air at about 550° C. for about 4 h. Performance of the PdZn catalyst described in this example is shown in FIG. 6.

Comparative Example 2

PdZn—ZrYLa/CeO$_2$

A first solution containing Pd, Zn, Y, La and Zr was prepared by adding 11.844 g of Pd(NO$_3$)$_2$ solution (20.77 wt % Pd), 38.659 g Zn(NO$_3$)$_2$.6H$_2$O, 1.484 g Zr(OH)$_4$, 9.024 g Y(NO$_3$)$_3$.6H$_2$O, and 0.668 g LaCl$_3$.7H$_2$O in 45.0 g of water with stirring.

A second solution was then prepared by adding 7.5 g urea and 0.461 g Na$_2$CO$_3$ in 30.0 g water. 50 g of CeO$_2$ (HSA20 from Rhodia) was added to the second solution in a ball mill jar resulting in a dense slurry. The first solution was then added to the dense slurry of CeO$_2$. The resulting mixture was ball milled until about 90% of the solid particles were less than 10 μm. Subsequently, the slurry was dried at about 120° C. for about 2 h and calcined in air at about 550° C. for about 4 h.

Catalyst Performance

Catalyst performance measurements for the steam-reforming of methanol were carried out in a tubular packed-bed type reactor consisting of a passivated (Silicosteel CR®) stainless steel tube with a ⅝-inch inner diameter. The bed of the reactor was packed with 3 g of catalyst that had been crushed and sieved to average diameter of about 125-250 μm. The reactor was then heated to 400° C. under an N$_2$ flow.

Once the reactor was at temperature, an about 63 weight percent solution of methanol in deionized water was fed by an HPLC pump at 2 mL/min (10 Psig) to a vaporizer operating at 240° C. The vaporized methanol-water mixture was then passed through the heated reactor. The vaporizer was optimized to maintain a stable flow rate and minimize fluctuations in the water-methanol molar ratio in the gas phase.

The composition of the gasses exiting the reactor were monitored and analyzed using an Agilent 3000A Micro gas chromatography system (GC) equipped with four channels and four TCD detectors. The entire system was automated and controlled using a computer for operation and data acquisition. The following gas phase species were analyzed: $H_2$, $CO_2$, CO, $H_2O$, $CH_4$, and $CH_3OH$. Methanol conversion and selectivity were calculated as follows:

$$CH3OH\_conversion, \% = \frac{CO\ \% + CO2\% + CH4\%}{CO\ \% + CO2\% + CH4\% + CH3OH\ \%} \quad (2)$$

$$CO\_selectivity, \% = \frac{CO\ \%}{CO\ \% + CO2\% + CH4\%} \quad (3)$$

$$CO2\_selectivity, \% = \frac{CO2\%}{CO\ \% + CO2\% + CH4\%} \quad (4)$$

$$CH4\_selectivity, \% = \frac{CH4\%}{CO\ \% + CO2\% + CH4\%} \quad (5)$$

$$H2\_selectivity, \% = \frac{CO2\%}{CO\ \% + CO2\% + CH4\%} \quad (6)$$

In the equations provided above, CO%, CO2%, CH4%, and CH3OH % represent percent CO, $CO_2$, $CH_4$ and $CH_3OH$ molar fraction in the reactor effluent as analyzed by GC respectively. Based on the stoichiometry of the reforming reaction (equation 1), the selectivity to $H_2$ is equal to that for $CO_2$.

Using the above described methodology, the selectivity results detailed in Table 1 were obtained for the catalysts of examples 1 through 5.

TABLE 1

Summary of catalysts performance at 400° C. (*)

| Catalyst Examples | Catalyst performance @ 400° C. | | | |
|---|---|---|---|---|
| | Methanol Conversion % | Selectivity, % | | |
| | | $H_2$ (or $CO_2$) | CO | $CH_4$ |
| Comparative Example 1‡ | 90% | 72% | 28% | 0 |
| Comparative Example 2 | 80% | 70% | 30% | 0 |
| Example 1 | 70% | 75% | 25% | 0 |
| Example 2 | 70% | 60% | 40% | 0 |
| Example 3 | 70% | 70% | 30% | 0 |
| Example 4 | 95% | 65% | 35% | 0 |
| Example 5 | 80% | 70% | 30% | 0 |

(*) 3 g catalyst, 63 wt % aqueous methanol solution fed at 2 mL/min; 10 Psig, performance at about 15-20 h time-on-stream operation;
‡ Data at about 20 h time-on-stream operation;

As shown in Table 1, the "Zn-free" embodiments of the catalyst described herein offer better or comparative performance than PdZn catalysts for methanol steam reforming. As such, the catalysts described herein can be useful in fuel cells incorporating a hydrogen separation membrane.

Although the catalysts, compositions, and methods discussed above have been described in detail with reference to examples above, it is understood that various modifications can be made without departing from their spirit, and would be readily known to the skilled artisan.

All cited patents and publications referred to above are herein incorporated by reference in their entirety for all purposes.

What is claimed is:

1. A catalyst for reforming methanol and steam into hydrogen gas for use in hydrogen fuel cells, the catalyst comprising:
   a catalytic component comprising:
      Pd present as an oxide and in a range of 0.5% to 10% of a total weight of the catalyst;
      a second element, the second element being capable of forming an alloy with Pd when the catalyst is in the presence of methanol and water vapor, wherein the second element selected from the group consisting of Sc, Nb, Ta, B, Al, Ga, In, Ti, Ge, Sn, and Pb, wherein a molar ratio of the second element to the Pd ranges from 1:5 to 1:1; and
   at least one promoter element present as an oxide, the at least one promoter element selected from group consisting of Li, N a, K, Rb, Cs, Be, Mg, Ca, Sr, Ba, Fe, Y, Zr, and combinations thereof, wherein the at least one promoter element is present in a range of up to 10% of the total weight of the catalyst; and
   a solid support having the catalytic component disposed thereon, the support selected from the group consisting of alumina, silica, $CeO_2$, ceramics, carbon, and mixtures thereof, wherein the support has a surface area greater than 5 $m^2/g$;
   said catalyst being free of Cu and Zn.

2. The catalyst for reforming methanol and steam into hydrogen gas for use in hydrogen fuel cells according to claim 1, wherein the second element is Ga.

3. The catalyst for reforming methanol and steam into hydrogen gas for use in hydrogen fuel cells according to claim 2, wherein the at least one promoter element is Zr.

4. The catalyst for reforming methanol and steam into hydrogen gas for use in hydrogen fuel cells according to claim 3, the catalytic component further comprising a second promoter element present as an oxide, wherein said second promoter element is Y.

5. The catalyst for reforming methanol and steam into hydrogen gas for use in hydrogen fuel cells according to claim 4, the catalytic component further comprising a third promoter element present as an oxide, wherein said third promoter element is Ba.

6. The catalyst for reforming methanol and steam into hydrogen gas for use in hydrogen fuel cells according to claim 3, the catalytic component further comprising a second promoter element present as an oxide, wherein the second promoter element is Ba.

7. The catalyst for reforming methanol and steam into hydrogen gas for use in hydrogen fuel cells according to claim 6, the catalytic component further comprising a third promoter element present as an oxide, wherein the third promoter element is Fe.

8. The catalyst for reforming methanol and steam into hydrogen gas for use in hydrogen fuel cells according to claim 1, wherein the solid support is $CeO_2$.

* * * * *